(12) United States Patent
Solem et al.

(10) Patent No.: US 10,068,157 B2
(45) Date of Patent: Sep. 4, 2018

(54) AUTOMATIC DETECTION OF NOTEWORTHY LOCATIONS

(75) Inventors: Jan Erik Solem, San Francisco, CA (US); Jerremy Holland, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 1713 days.

(21) Appl. No.: 13/468,391

(22) Filed: May 10, 2012

(65) Prior Publication Data
US 2013/0300830 A1    Nov. 14, 2013

(51) Int. Cl.
*G06K 9/68*    (2006.01)
*G06F 17/30*    (2006.01)
*G06T 7/73*    (2017.01)

(52) U.S. Cl.
CPC ......... *G06K 9/68* (2013.01); *G06F 17/30241* (2013.01); *G06T 7/74* (2017.01); *G06T 2207/30244* (2013.01)

(58) Field of Classification Search
CPC ..... G06F 17/30241; G06T 2207/30244; G06T 7/0044
See application file for complete search history.

(56) References Cited

U.S. PATENT DOCUMENTS

| | | | |
|---|---|---|---|
| 2006/0149458 A1* | 7/2006 | Costello et al. | 701/200 |
| 2009/0153678 A1* | 6/2009 | Nonaka et al. | 348/208.4 |
| 2011/0044563 A1* | 2/2011 | Blose et al. | 382/306 |
| 2011/0167389 A1* | 7/2011 | Murakami et al. | 715/835 |
| 2011/0182475 A1* | 7/2011 | Fairfield et al. | 382/104 |

OTHER PUBLICATIONS

Hartley, R., et al., "Multiple View Geometry in computer vision," Second Edition, © Cambridge University Press 2000, 2003, Chapters 9, 10 and 18; 75 pages.

* cited by examiner

*Primary Examiner* — Md Haque
(74) *Attorney, Agent, or Firm* — Blank Rome LLP (57) ABSTRACT

By providing 3D representations of noteworthy locations for comparison with images, the 3D location of the imaging device, as well as the orientation of the device may be determined. The 3D location and orientation of the imaging device then allows for enhanced navigation in a collection of images, as well as enhanced visualization and editing capabilities. The 3D representations of noteworthy locations may be provided in a database that may be stored local or remote to the imaging device or a programmable device processing images obtained from the imaging device.

31 Claims, 7 Drawing Sheets

AUTOMATIC DETECTION OF NOTEWORTHY LOCATIONS

BACKGROUND

This disclosure relates generally to the field of digital imaging. More particularly, but not by way of limitation, it relates to a technique for associating three-dimensional location and camera orientation information with an image containing a noteworthy location.

Photography has been an innovative field since the earliest crude photographs were produced, developing from camera obscura and pinhole cameras to chemically-developed film cameras in the 19$^{th}$ century to digital cameras in the late 20$^{th}$ century. With digital photography has come an ability to manipulate images, providing capabilities not practical or possible with film. Individuals may easily create or collect libraries of thousands of digital images, using software to organize and navigate through those libraries. In addition to standalone imaging devices such as traditional cameras, imaging devices are now ubiquitous in a wide variety of other devices, including smartphones and tablet computers.

The inclusion of global positioning system (GPS) receivers in those imaging devices allows photographers to include latitude and longitude information with those images, typically as part of metadata stored in the image file. The addition of such location information to an image is generally known as geo-tagging the image, with the resulting location information referred to as geodata. Geo-tagging may be performed by the imaging device or other associated logic at the time of imaging, or may be performed by post-processing an image to add the geodata where the imaging device did not have GPS capability or where the GPS receiver was disabled or unable to obtain a location signal from a GPS satellite at imaging time.

Latitude and longitude information has been very useful for numerous applications. However, latitude and longitude only provide only two-dimensional (2D) geodata and do not provide either three-dimensional (3D) geodata or information about the orientation of the imaging device. Having 3D geodata and orientation information would be useful.

SUMMARY

By providing 3D representations of noteworthy locations for comparison with images, the 3D location of the imaging device, as well as the orientation of the device may be determined. The 3D location and orientation of the imaging device then allows for enhanced navigation in a collection of images, as well as enhanced visualization and editing capabilities.

A method to determine location information from an image is disclosed. The method includes obtaining a first image; acquiring object recognition information for the first image; comparing the object recognition information to a database comprising three-dimensional models of multiple noteworthy locations; determining the first image includes a representation of at least a portion of one or more noteworthy locations based, at least in part, on the act of comparing; identifying a three-dimensional location for the first image based, at least in part, on the act of determining and a three-dimensional location corresponding approximately to a location in three-space from where the first image was captured; and associating the three-dimensional location with the first image.

A programmable imaging device is disclosed. The device includes an imaging sensor; a location sensor; a programmable control device, coupled to the imaging sensor and the location sensor; a storage medium, coupled to the programmable control device; and software, stored on the storage medium. The software includes instructions that when executed by the programmable control device, cause the programmable control device to perform actions that include capturing a first image using the imaging sensor; calculating a three-dimensional geodata for the programmable imaging device where the first image was captured using the location sensor; acquiring object recognition information for the first image; comparing the object recognition information to three-dimensional representations of multiple predefined locations; determining the first image includes a representation of at least a part of one or more of the predefined locations based, at least in part, on the act of comparing; identifying a three-dimensional location for the programmable imaging device based, at least in part, on the act of determining, and the three-dimensional geodata; and associating the three-dimensional location with the first image.

A program storage medium is disclosed. Software is stored software on the program storage medium to control a programmable device, the software including computer code for obtaining a first image; computer code for acquiring object recognition information for the first image; computer code for comparing the object recognition information to three-dimensional representations of multiple noteworthy locations; computer code for determining the first image includes a representation of at least a portion of one or more noteworthy locations based, at least in part, on the act of comparing; computer code for identifying a three-dimensional location and orientation for the first image based, at least in part, on the act of determining the three-dimensional location corresponding approximately to a location in three-space from where the first image was captured; and computer code for associating the three-dimensional location with the first image.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

By providing 3D representations of noteworthy locations that are tagged with 3D geodata, a provider of image organization and editing software may improve users' ability to navigate through a collection of images using those tagged representations. The noteworthy locations can be recognized automatically by the software and used to enhance navigation, visualization, and editing.

Although the most common GPS receivers use data from GPS satellites maintained by the United States, other satellite navigation systems are known or currently planned, including the GLONASS system (Russia), the Compass system (China), and the Galileo system (European Union). As used herein, GPS receivers and GPS systems should be understood as referring to any satellite navigation system of satellites and receivers for receiving location signals from those satellites.

Current image manipulation software provides ways to organize geo-tagged images based on the 2D geodata, and to navigate through a collection based on the geodata.

Most current geo-tagging techniques store only 2D information, such as latitude and longitude coordinates of the location of the imaging device, and temporal information, typically the time the image was captured or geo-tagged, if the geo-tagging occurred after the image was captured. However, GPS data includes 3D geodata, that may be used to position the location of the GPS receiver—and thus the imaging device in which the GPS receiver is embedded—in 3D spatial coordinates. Thus, the 3D geo-tagging information and temporal information may be used to locate an imaging device in space and time. That information, in turn, may be used to locate objects being imaged by the device, in addition to the device.

In addition, imaging devices may contain sensors, such as gyroscopic components, that may provide rotational orientation information that may be integrated with 3D spatial coordinates to identify not just the location of the imaging device, but where it was pointed when the image was taken, which may further be used to identify objects in the image.

Any desired format of the 3D representation of noteworthy locations may be used as well as any desired technique for generating the 3D representation that may be rendered for viewing by a user. The 3D representations also include other information such as the spatial location of the place in 3D space, and other information to allow recognition of the place.

Numerous types of 3D representations and generation techniques are known in the art, and need not be described in detail herein. Examples of the 3D representation include: a textured mesh model, at any desired resolution of polygonal count, together with image features, which may be quantized with vocabularies or codebooks, and additional metadata as labels and links. The 3D representations shipped with or provided for use with imaging applications may vary depending on the application (e.g., still imaging or video applications) and depending on the platform (e.g. desktop or mobile). The 3D representations may be generated with data from mapping services and may contain connections to such mapping services. The 3D representations may be shipped with the applications, downloaded by users of the application upon demand, or be made available as needed from a cloud server. If the 3D representation data is used in real time while or just after an image has been captured, the imaging device may need access to only a subset of the 3D representations that are available, such as a subset of the 3D representations that are specific to a regional location of the imaging device.

A noteworthy location as used herein is any predefined location for which a 3D representation of the location may be constructed. A noteworthy location may be any predefined object or place that has been selected by a provider of the image manipulation software, and need not be famous. For example, famous landmarks, such as the White House, Lincoln Memorial, and Vietnam Veteran's Memorial in Washington, D.C., the Eiffel Tower in Paris, France, the Seattle Space Needle, Wall Street in New York City, or Mount Rushmore in South Dakota may be selected as noteworthy locations. Other noteworthy locations may be selected by the provider of the image manipulation software based on a review of images captured by users. Noteworthy locations may include places that are imaged by numerous people, even if those places would not normally be considered famous. No valuation of the object or place is assumed by being considered noteworthy. In addition to the image manipulation software provider selecting noteworthy locations, users may be able to submit images or 3D models of a place they deem noteworthy or nominate places that they deem noteworthy, letting the software provider generate 3D models from those images or from places selected as noteworthy from the nominated places.

The 3D models or representations of the noteworthy locations may then be provided with imaging applications so that those places can be recognized automatically by the application and used to enhance navigation, visualization, and editing. Other 3D models may be added to those provided by the software provider.

When using an image manipulation application that incorporates 3D representations of noteworthy locations, a user may be able to switch from a standard photo view, such as a list or grid view, to a photo layout based on position and view, possibly with rendered 3D data in the background. The image manipulation application may also show labels and landmarks in photos.

These techniques are not limited to still images, but may be provided in video software, allowing users to blend 3D views with video data in editing, create scene and cut transitions, add pre-rendered models to video, or fly through selected places in the edited video. As with still imaging software, the video software may use pre-defined collections of 3D representations that are shipped with or provided for the video software, as described above.

In one example implementation, a collection of famous places may be shipped with a still image application, provided as an add-on to the application, or may be accessible by the application from a cloud-based source. Using the geodata for a set of images, which may be entered manually, obtained from the image's Exchangeable Image File Format (EXIF) data, or otherwise, the application may determine whether any available 3D representations are near (using any desired or configured definition of "near") to the location defined by the geodata. If so, the application may then detect features in the images and attempt to match them against features stored in the 3D representation. A match gives a correspondence between regions in the image and regions in the 3D representations. The detected correspondences may then be used to calculate a position of the camera, including an absolute orientation of the imaging device when the image was captured. Any desired technique for calculating a position of the camera may be used, such as techniques disclosed in Multiple View Geometry in Computer Vision, Richard Hartley and Andrew Zisserman, Cambridge University Press, March 2004, which is incorporated by reference in its entirety.

The geodata associated with an image may be stored as metadata data within the image, such as EXIF data stored in an image file. Alternately, the geodata associated with the image may be stored separately from the image in an external database. The separate database may be specific to the image, or may be a database in which geodata for multiple images may be stored. As explained above, the geodata database, if used, may be any form of database, including structured and non-structured databases.

Figure 1:
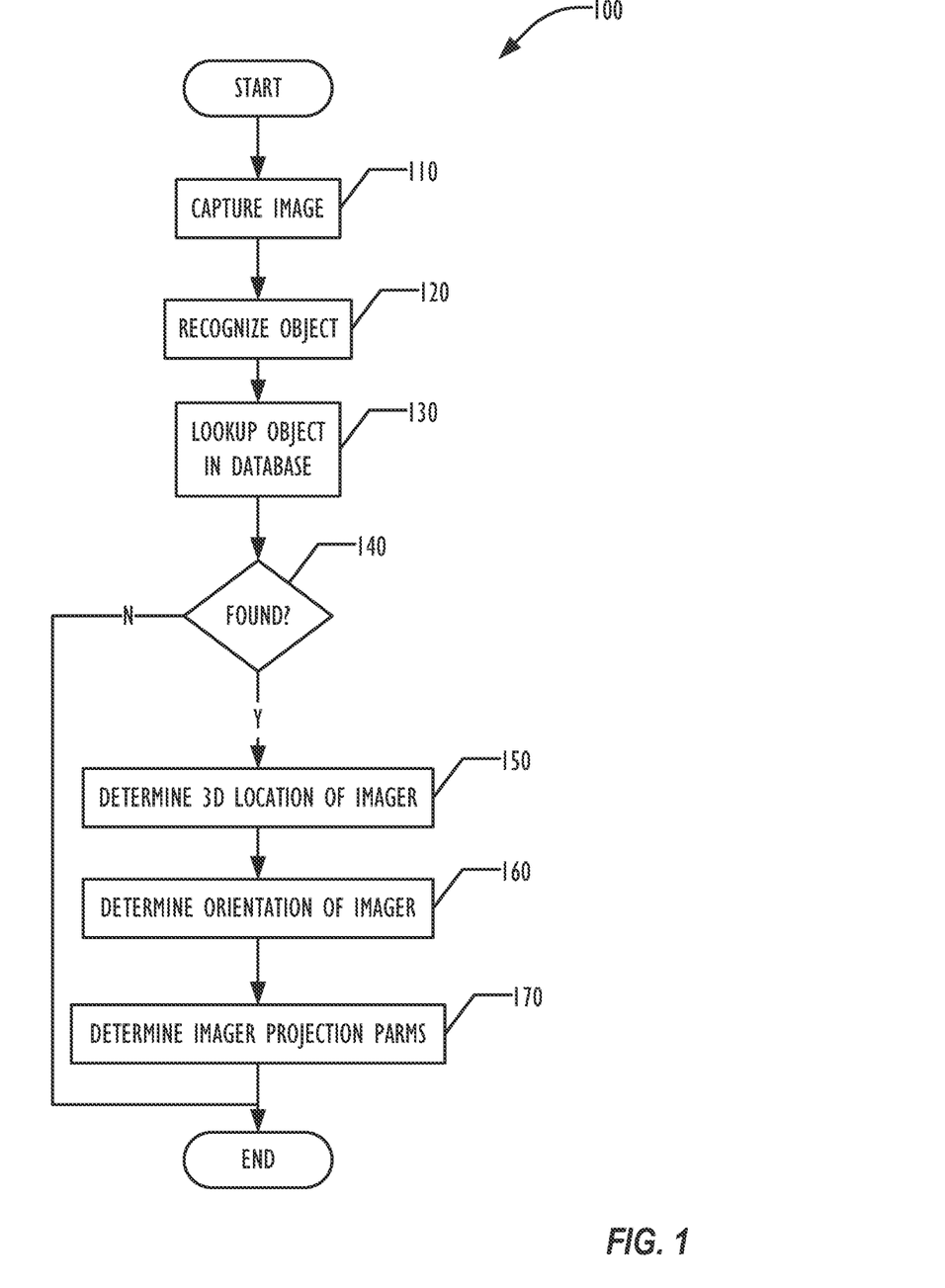
FIG. 1 is a flowchart illustrating a technique for determining a 3D location and orientation of an imager.

FIG. 1 is a flowchart illustrating a technique for determining a 3D spatial location and an orientation of an imaging device by recognizing objects in the image as noteworthy object contained in a database of noteworthy objects. The database may be organized and stored in any desired way, and the term database includes any way of storing a collection of data, including both structured databases and unstructured databases, such as simple flat files. In block 110, the image is captured by an imaging device, which may be a dedicated camera, or an embedded imaging component of a multifunction device, such as the camera on a smart phone. Object recognition information may be obtained in block 120 for objects in the captured image using any desired object recognition techniques. In block 130, the recognized objects may be searched for in the noteworthy locations database.

In some implementations, the image and/or object recognition information may be transferred from the imaging device to another programmable device for performing the remaining actions. For example, if the imaging device is a mobile device such as an IPAD® tablet device from Apple Inc., the image and object recognition information may be processed on the tablet by an application such as the IPHOTO® application, or may be transferred to another device, such as a desktop or laptop computer for further processing. (IPAD and IPHOTO are registered trademarks of Apple Inc.)

If found, as indicated in block 140, then in block 150 the 3D location of the imaging device may be calculated, using geodata already contained in the image, as well as geodata associated with the 3D representation of the object in the noteworthy locations database. This updated 3d location may add Z-axis information to 2D geodata contained in or associated with the image, and may also refine the 2D geodata already in the image based on calculation of a distance between the object and the imaging device and the orientation of the imaging device at the time the image was captured. The relationship between the location of the imaging device and the location of the matching image will be used to derive the orientation of the imaging device.

Although described herein as "the location" and "the orientation" of the imager, the resulting 3D geodata and orientation for the imager calculated using the techniques described herein are necessarily approximations of a precise actual three-space location and orientation of the imager at the time the image was captured. The accuracy of the approximation is dependent upon various factors, including the accuracy and number of 3D representations available to use, as well as the resolution of the underlying GPS geodata.

For example, GPS data is generally considered to be more precise when calculating locations in horizontal dimensions and less precise when calculating locations in vertical dimensions. Positioning obtained through matching image features may be much more accurate than GPS accuracy. In another example, if more than one noteworthy location is discovered in an image, the calculation may be performed based upon information in multiple 3D representations, which may improve the accuracy of the calculated approximate location. Multiple images with the same 3D representation(s) may also improve the calculated location.

In block 160 the orientation of the imaging device may be calculated by comparing the view of the noteworthy location in the image to that found in the image in block 120. The orientation provides the approximate direction from which the image was captured.

In block 170, imaging device projection parameters may be calculated using the 3D location of the imaging device and orientation determined in blocks 150 and 160. These imaging device projection parameters may be used for assisting in 3D navigation, as well as for rendering the 3D representation of the noteworthy location into a 2D or 3D display space. Examples of imaging device projection parameters are the imaging device's intrinsic matrix, focal length, and radial distortion.

The techniques illustrated in the flowcharts and described herein are illustrative and by way of example only. Actions that are illustrated as separate may be combined, actions may be separated into multiple actions, and actions that are indicated as sequential may be performed in different orders, including simultaneously. For example, the actions of blocks 150, 160, and 170 may be performed simultaneously or in any desired other order.

Because the imaging device has a field of view onto a noteworthy location, a determination of what landmarks and notable items are in the captured image may be achieved by pulling a list of noteworthy places from the projection onto the 3D model.

Figure 2:
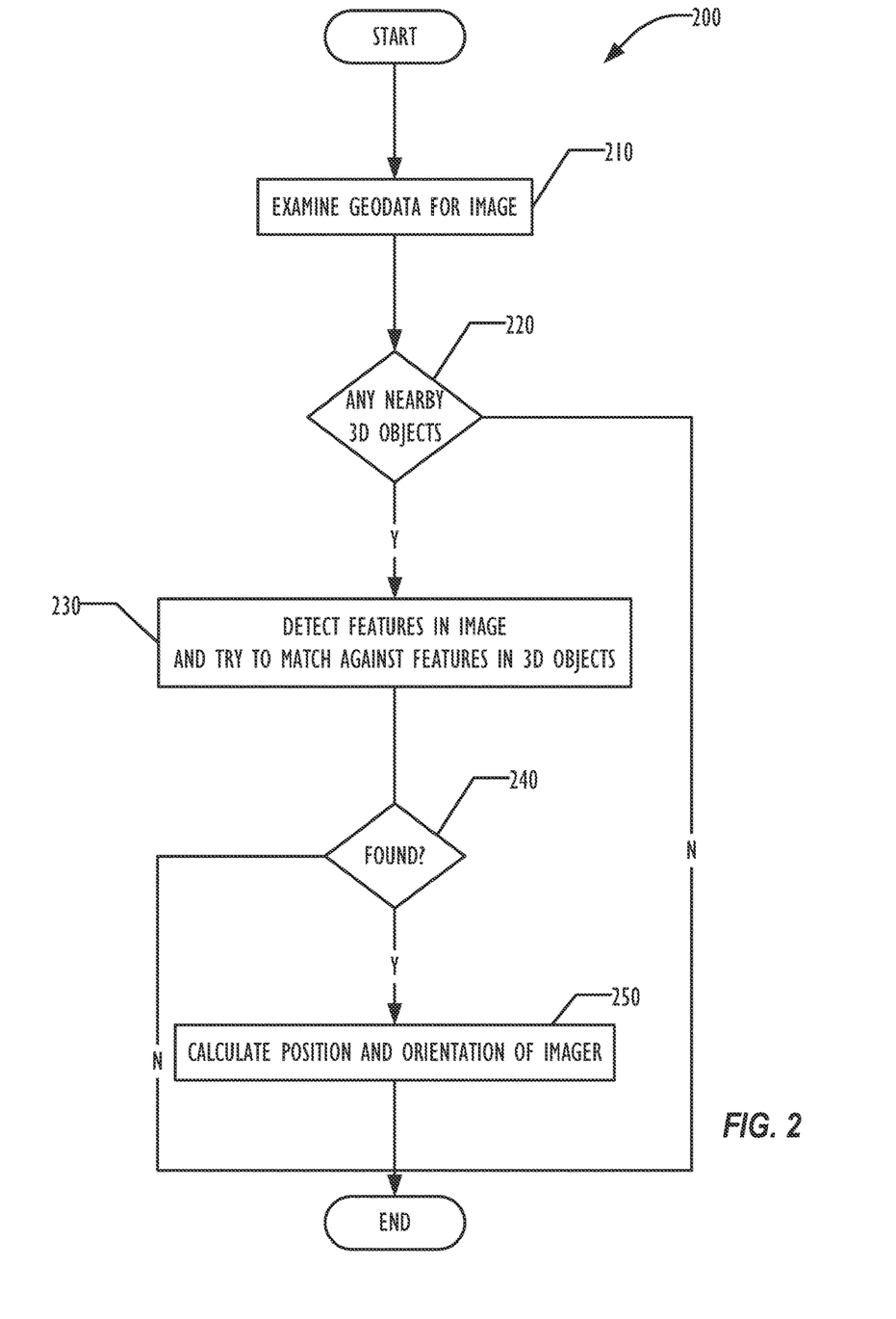
FIG. 2 is a flowchart illustrating a technique for determining a 3D location and orientation of an imager.

FIG. 2 is a flowchart illustrating a variant technique 200 for determining the position and orientation of the imager. In block 210, the existing geodata for an image is extracted and examined. In block 220, that geodata is used to locate any nearby noteworthy locations with 3D representations. If none are found, then the technique finishes. Otherwise, in block 230, the image is examined to try to detect features in the image, and to attempt to match those features with corresponding features in the 3D representations selected in block 220. If block 240 determines that no matches were found, the technique completes. Otherwise, the 3D position and orientation for the imager may be calculated in block 250, using the geodata and 3D representation data of the matched noteworthy location. Techniques for calculating the 3D position and orientation of an imager that captured an image of at least a portion of an object with a known 3D location and orientation, such as are performed in block 250 are known in the art and need not be further described herein.

Once more accurate information on the position and orientation of the imaging device is known for an image, the images may be organized based on the imaging device's position and orientation. Alternatively, the images may be organized based on the visible 3D structures, as determined by the correspondences to the 3D representation.

The information may also be used to create panographs, panoramas, or other composite views. Parts of the 3D representation may be used to fill in data or generate backgrounds. Once the composite view is created, information associated with the 3D representation may be overlaid on the composite view. Similarly, tags or labels may be added, identifying the noteworthy locations visible in the composite view.

In a video implementation, the collection of noteworthy locations may be shipped in a video application. Based on geodata for a video clip the application may determine whether any places with an available 3D representation are nearby. Keyframes from the video may be processed for features corresponding to features stored in the 3D representation of a noteworthy location. This gives correspondences between regions in the video and 3D locations in the 3D representation.

Based on these correspondences, an accurate position of the imaging device may be computed for each frame of the video, including a 3D position and the absolute orientation of the imaging device for each frame. Video clips may then be organized based on absolute imaging device positions and orientations and cut transitions that move in 3D can be added. These could use the 3D representation for interpolation.

"Flight paths" of renderings from the 3D representation can be added to the video clip in editing mode. These renderings may be pre-generated for each noteworthy location and ship with the application or be custom generated when editing.

Some examples would be to have a camera fly from the location and orientation of the camera in 3D space of the first image to the location and orientation in 3D space of the second image, and so on through a set of images. The images could be floating in empty space, or the photos could be superimposed in front of a rough 3D model of the location, so the transitions from one photo to the next would be seen as though the camera were flying through a path in a solid (or even wire-frame) rendering of the noteworthy location.

Thus, information from the 3D representation can be used to enhance the video clip, allowing the creation of features such as overlays, location tags, or object tags in the video clip. Techniques for creating overlays or tags in a video frame are known in the art and need not be further described herein.

By performing the techniques described above on multiple images, a collection of images may be created, each of which is associated with 3D geodata and orientation information. This collection of images and associated information allows for navigation techniques and visual 3D transitions between one image and a next image based on the 3D location and orientation of the images. The collection of images may be stored in a library of images or in any other way as desired.

Although as described above, 3D geodata and orientation information associated with the images is used, an image with no associated 3D geodata or orientation information may use object recognition techniques to recognize landmarks in the image and determine location and/or orientation information associated with those landmarks. The image provides a field of view onto the noteworthy locations represented in the image, and software may determine a list of landmarks and other noteworthy objects in the field of view and project them onto 3D models.

Figure 3:
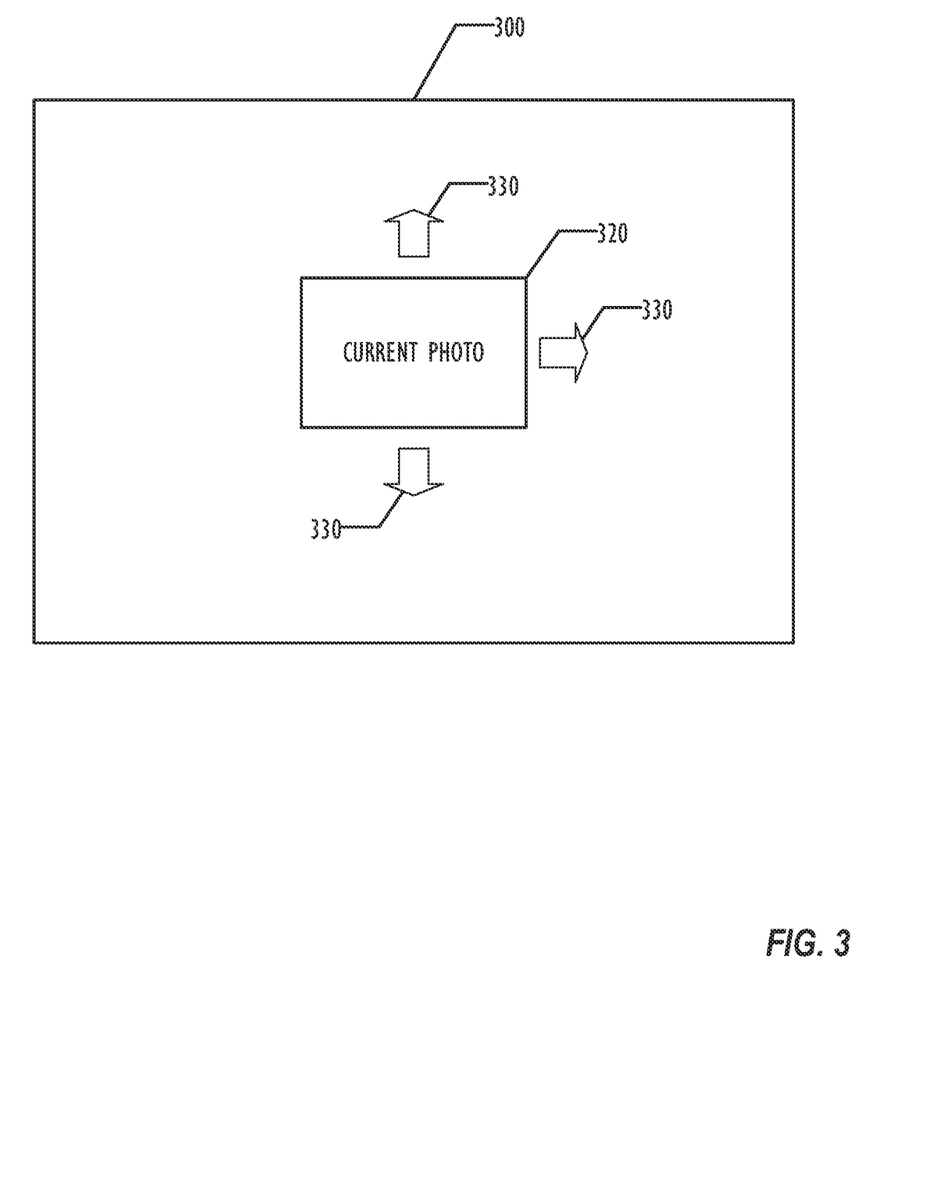
FIG. 3 is a block diagram illustrating a user interface for navigating among images based upon the 3D spatial location and orientation of an imager.

FIG. 3 is a block diagram illustrating a user interface display 300 on which an image 320 including at least some portion of a noteworthy location is displayed. Arrows 330 provide direction indicators that indicate to the user that navigation is possible in the indicated direction of motion from image 320 to another image. Unlike a simple image grid, however, in this display navigation is done using compass directions (north, south, east, and west, or other relevant directions), and an arrow 330 for a spatial direction may be omitted from the display if no image in the collection taken in that direction includes any portion of some noteworthy location. As illustrated in FIG. 3, for example, the image collection does not contain any images captured west of the current image 320, thus there is no arrow pointing leftwards of image 320. The correspondence of the directional arrows to compass directions may vary depending on the orientation of the display 300. If the user selects one of the direction indicator arrows 330, a notification may be received by the navigation software. The navigation software may then use the notification to display an image having a three-dimensional location corresponding to the direction of motion relative to the first image indicated by the notification.

In addition to compass directions, the user may also have the ability to zoom in and out. With a wide shot taken from far away with a wide-angle lens and a close-up shot of the same object, the user may be able to navigate into and out of the plane of the computer screen, providing true 3D navigation.

Figure 4:
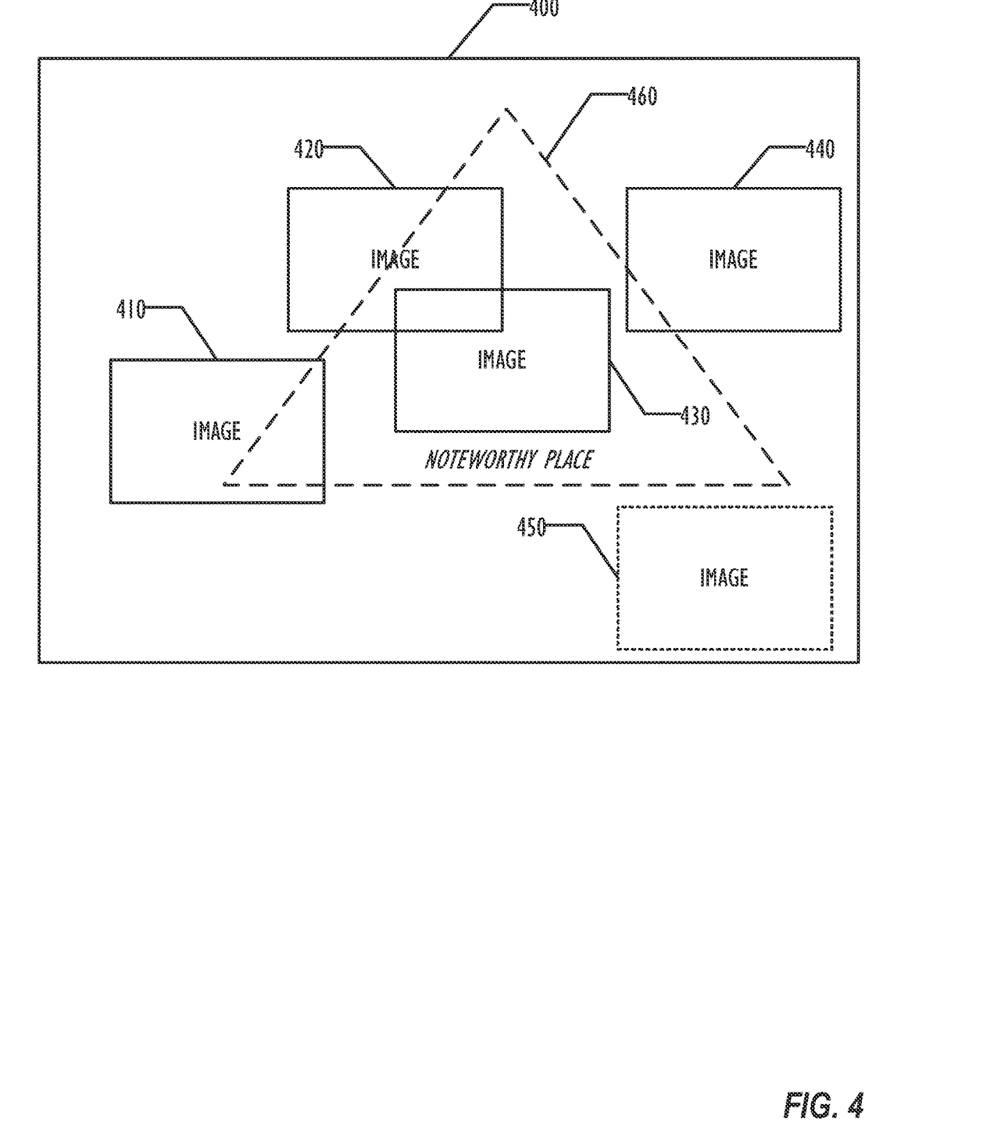
FIG. 4 is a block diagram illustrating a user interface for navigating among images that contain at least a portion of a noteworthy location.

FIG. 4 is a block diagram in which multiple images (410, 420, 430, and 440) from a collection of images are displayed in a display 400, because those images include a portion of noteworthy location 460. Noteworthy location 460 is illustrated in FIG. 4 in dashed lines to indicate that it is not actually visible in the display, except where a portion of the location 460 is visible in one of images 410, 420, 430, and 440. Image 450 is contained in the collection, but does not contain any portion of noteworthy location 460, thus is not actually visible in the display 400, as indicated by the use of dotted lines. The images may have been taken of noteworthy location 460 from different locations or orientations or from the same locations and orientation. A user may navigate between the images 410, 420, 430, and 440, but would not navigate to image 450. The image manipulation software may ignore time data associated with the images when selecting images for display, or may choose to limit the display further to images taken within a desired temporal window. Although only one noteworthy location 460 is illustrated in FIG. 4 for clarity, display 400 may include images taken of multiple noteworthy locations.

A user interface may label or tag images including a portion of a noteworthy location with information about the noteworthy location. The information may include a link to an external website that discusses the noteworthy location. The information for inclusion in the tags or labels may be included in the database of noteworthy locations. The tagging of noteworthy locations in images may be performed at the discretion of the user, or may be performed automatically upon importing an image into an image collection.

Figure 5:
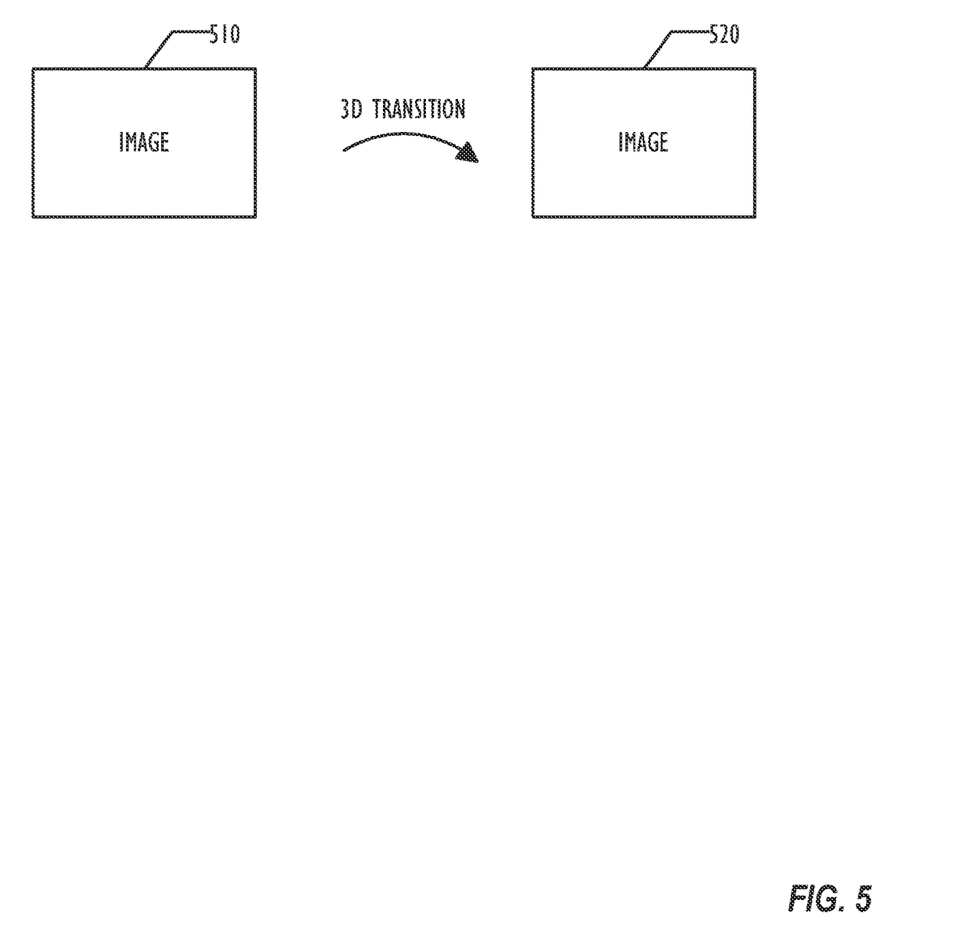
FIG. 5 is a block diagram illustrating a user interface for 3D transitioning between two images.

FIG. 5 is a block diagram illustrating that the 3D geodata and orientation information obtained as described above and the 3D representation of a noteworthy location may be used for performing a 3D visual transition between images 510 and 520. For example, if images 510 and 520 were taken by rotating the imaging device upwards from a starting rotational position in image 510 to an ending rotational position in image 520, the navigation may allow the user to view a transition that pans upward on an object at the location of the images. Information from the 3D representation may be used as desired to smooth the transition between the starting point of image 510 and the endpoint of image 520. The 3D transition may be a visually smooth transition. Such a transition typically may be generated between images 510 and 520 when the images are at least approximately co-located. The imager projection parameters calculated in block 170 of the technique of FIG. 1 may be used to create an image projection matrix defining a position of a plane in 3D space at an angle corresponding to the orientation of the imager. The calculation of 3D transitions between images based upon imager projection matrices is known in the art and need not be described in further detail herein. The 3D transition is not limited to still images, but may also be performed for video frames, allowing a video editing tool to supply transitions.

Implementation in an Electronic Device

Figure 6:
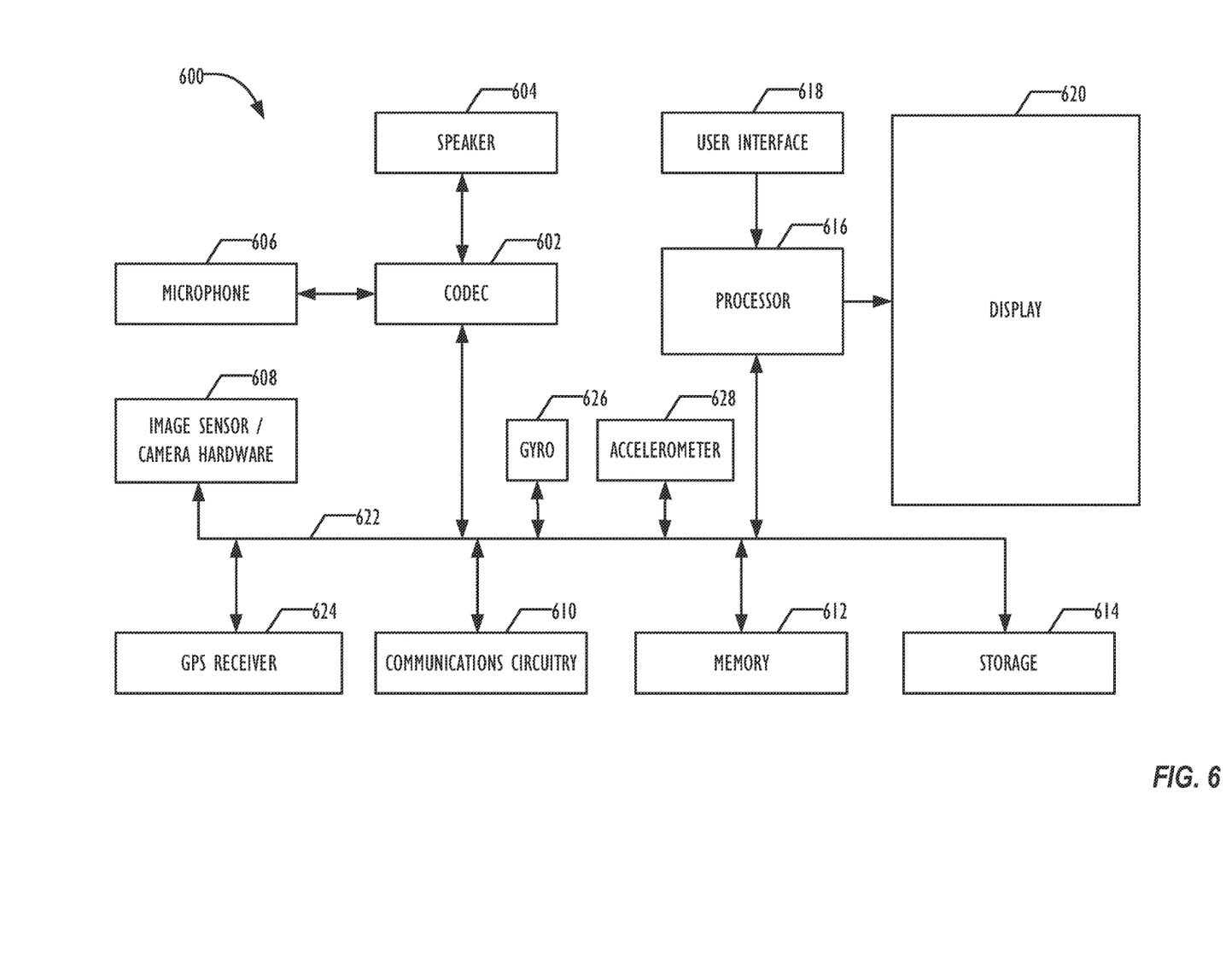
FIG. 6 is a block diagram illustrating a programmable device for implementing techniques described herein.

FIG. 6 is a simplified functional block diagram illustrating a programmable imaging device 600 according to one embodiment that can implement the techniques described above. The imaging device 600 may include a processor 616, display 620, microphone 606, audio/video codecs 602, speaker 604, communications circuitry 610, an imaging sensor with associated camera hardware 608 for performing image capture, user interface 618, memory 612, storage device 614, and communications bus 622. A location sensor 624, such as a GPS receiver, provides access to 3D geodata, such as GPS data, while an orientation sensor 626, such as a gyroscopic sensor, and a motion sensor 628, such as an accelerometer, provide information about the approximate orientation and movement of the programmable device 600.

Processor 616 may be any suitable programmable control device and may control the operation of many functions, such as the generation and/or processing of image data, as well as other functions performed by electronic device 600. Processor 616 may drive display 620 and may receive user inputs from the user interface 618. Storage device 614 may store media (e.g., image and video files), software (e.g., for implementing various functions on device 600), preference information, device profile information, and any other suitable data. Storage device 614 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++).

Memory 612 may include one or more different types of memory which may be used for performing device functions. For example, memory 612 may include cache, ROM, and/or RAM. Communications bus 622 may provide a data transfer path for transferring data to, from, or between at least storage device 614, memory 612, and processor 616. Although referred to as a bus, communications bus 622 is not limited to any specific data transfer technology. User interface 618 may allow a user to interact with the electronic device 600. For example, the user interface 618 can take a variety of forms, such as a button, keypad, dial, a click wheel, or a touch screen.

In one embodiment, the programmable device 600 may be a programmable device capable of processing and displaying media, such as image and video files. For example, the electronic device 600 may be a device such as a mobile phone, personal data assistant (PDA), portable music player, monitor, television, laptop, desktop, tablet computer, or other suitable personal device.

The programmable device 600 is illustrative and by way of example only. Some programmable devices 600 may have a subset or a superset of the elements described above. For example, some programmable devices may not have imaging capability, but merely have the ability to process imaging data as described herein, where the imaging data may be received from other devices. The programmable device 600 may be a mobile device or a generally non-mobile device, such as a desktop computer system.

A Networked System

Figure 7:
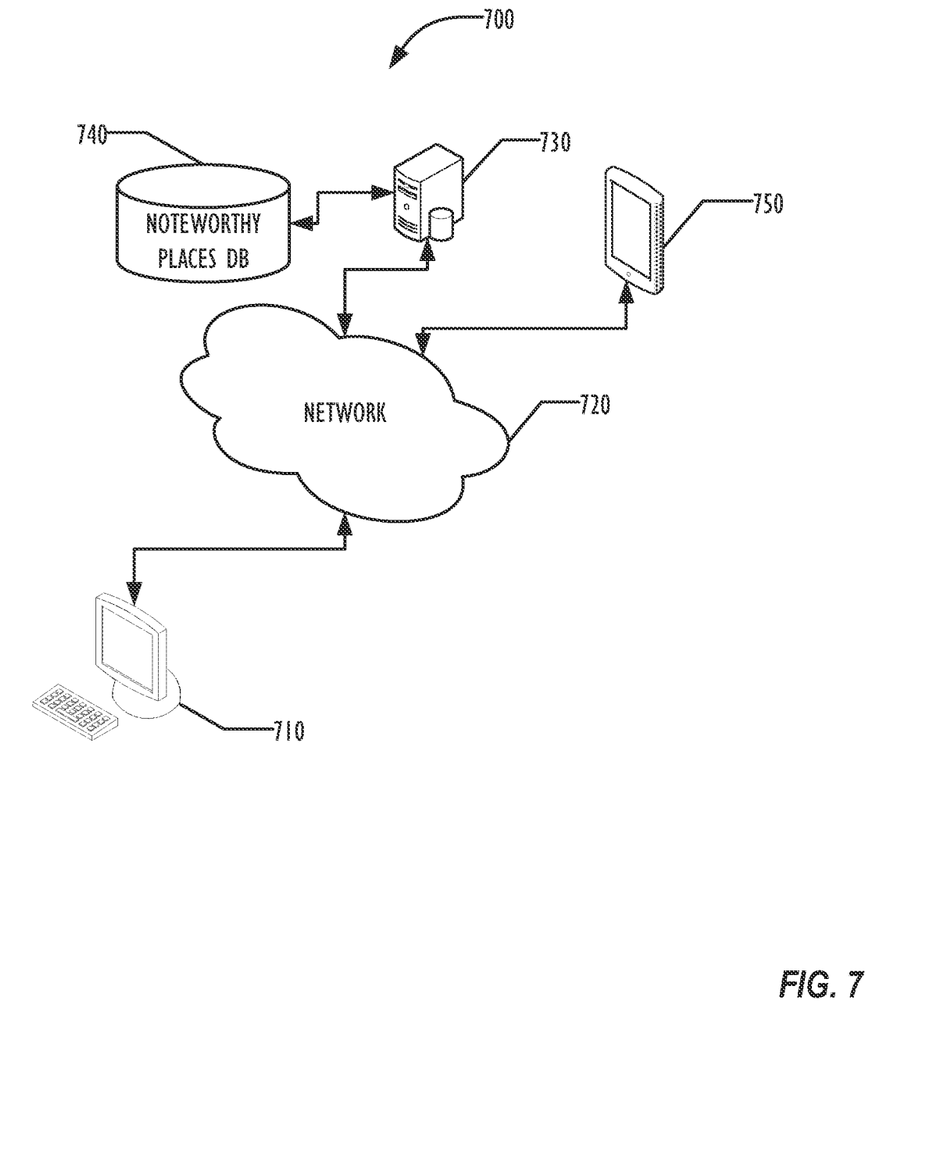
FIG. 7 is a block diagram illustrating a networked system for implementing techniques described herein.

FIG. 7 is a block diagram illustrating a networked system 700 that may implement the techniques described above. Desktop computer 710 and a mobile tablet device 750, for example an IPAD® tablet from Apple Inc. may both access a database of noteworthy locations 740 hosted by server 730 via a network 720. The network 720 may be any type of network, wire or wireless, and may be a collection of interconnected networks, even though illustrated in FIG. 7 as a single network. Image processing software on either the desktop computer 710 or tablet device 750 may view, organize, edit, and navigate through a collection of images, some of which may include at least portions of noteworthy locations, information about which is stored in the noteworthy locations database 740. The images viewed, manipulated, or navigated through at either desktop computer 710 or tablet 750 may be stored local to that device, or may be stored at some other network-connected location, not shown in FIG. 7 for clarity. When a user of (for example) the tablet 750 executes an image organization and editing application, the application may determine whether one or more images include at least a portion of one or more noteworthy locations, based on information retrieved from the noteworthy locations database, using the techniques described above.

In addition, as explained above, the mobile tablet device 750 (or other imaging devices) may capture the image, and transfer the images and/or additional data to the desktop computer 710 (or any other device) where the image organization and editing software is installed. The transfer may be via the network 720, by transfer of media containing the image between devices, or by a direct connection between the mobile device 750 and the computer 710. Although as illustrated in FIG. 7, the desktop computer 710 may use a noteworthy locations database 740 accessed via the network 720, the database 740 may alternately be installed on the computer 740, allowing the computer 710 to use the techniques described above even when not connected to the network 720.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method to determine location information from an image, comprising:
  obtaining a first image;
  acquiring object recognition information for the first image;
  comparing the object recognition information to a database comprising a plurality of three-dimensional models of a plurality of noteworthy locations;
  determining the first image includes a representation of at least a portion of one or more noteworthy locations based, at least in part, on the comparing;
  identifying a three-dimensional location from which the first image was captured based, at least in part, on the determining and location data corresponding approximately to a location from which the first image was captured; and associating the three-dimensional location with the first image.

2. The method of claim 1, wherein the location data is obtained by obtaining geodata for the first image.

3. The method of claim 2, wherein obtaining geodata for the first image comprises obtaining GPS data from metadata of the first image.

4. The method of claim 2, wherein obtaining geodata for the first image comprises obtaining GPS data from a database associated with the first image, the database being an object different from the first image.

5. The method of claim 2, wherein identifying a three-dimensional location comprises identifying a location based, at least in part, on the determining and the geodata.

6. The method of claim 1, further comprising calculating an orientation of the first image based, at least in part, on the determining, wherein the orientation corresponds to an approximate direction from which the first image was captured.

7. The method of claim 1, further comprising:
performing the obtaining, acquiring, comparing, determining, and identifying for each of one or more additional images, wherein the first image and the one or more additional images comprise a collection of images, and wherein the three-dimensional location for each of the collection of images is approximately co-located;
generating a transition between two images of the collection of images based, at least in part, on the three-dimensional location for each of the two images and at least one of the plurality of three-dimensional models;
displaying a first image of the two images;
displaying the transition; and
displaying a second image of the two images based, at least in part, on the transition.

8. The method of claim 7, wherein the transition comprises a visual three-dimensional transition.

9. The method of claim 1, further comprising:
performing the obtaining, acquiring, comparing, determining, and identifying for each of one or more additional images, wherein the first image and the one or more additional images comprise a collection of images, and wherein the three-dimensional location for each of the collection of images is approximately co-located;
displaying a first image of the collection of images;
displaying one or more direction indicators, wherein each direction indicator indicates a direction of motion from the first image to another image of the collection of images;
receiving a notification that one of the one or more direction indicators has been activated; and
displaying a second image of the collection of images based on the notification, wherein the second image has a three-dimensional location corresponding to the direction of motion relative to the first image corresponding to the notification.

10. The method of claim 9, further comprising generating and displaying a visually smooth transition from the first image to the second image.

11. The method of claim 1, further comprising:
inserting links to external information associated with a noteworthy location represented in the first image.

12. The method of claim 1, further comprising:
inserting into the first image external information associated with a noteworthy location represented in the first image.

13. A programmable imaging device, comprising:
an imaging sensor;
a location sensor;
a programmable control device, coupled to the imaging sensor and the location sensor;
a storage medium, coupled to the programmable control device; and
software, stored on the storage medium, comprising instructions that when executed by the programmable control device, cause the programmable control device to perform actions, comprising:
capturing a first image using the imaging sensor;
calculating geodata for the programmable imaging device where the first image was captured using the location sensor;
acquiring object recognition information for the first image;
comparing the object recognition information to a plurality of three-dimensional representations of a plurality of predefined locations;
determining the first image includes a representation of at least a part of one or more of the predefined locations based, at least in part, on the comparing;
identifying a three-dimensional location and orientation for the programmable imaging device based, at least in part, on the determining and on the geodata; and
associating the three-dimensional location with the first image.

14. The programmable imaging device of claim 13, wherein calculating geodata for the programmable imaging device comprises storing the geodata in an external database, associated with the first image.

15. The programmable imaging device of claim 13, further comprising instructions that when executed by the programmable control device, cause the programmable control device to perform actions, comprising:
determining an orientation of the programmable imaging device, based at least in part on an orientation sensor and on the determining, wherein the orientation corresponds to an approximate orientation of the programmable imaging device when the first image was captured.

16. The programmable imaging device of claim 13, further comprising instructions that when executed by the programmable control device, cause the programmable control device to perform actions, comprising:
performing the capturing, calculating, comparing, determining, and identifying for each of one or more additional images, wherein the first image and the one or more additional images comprise a collection of images, and wherein the three-dimensional location for each of the collection of images is approximately co-located;
generating a three-dimensional visual transition between two images of the collection of images based, at least in part, on the three-dimensional location for each of the two images and at least one of the plurality of three-dimensional representations;
displaying a first image of the two images;
displaying the transition; and
displaying a second image of the two images based, at least in part, on the transition.

17. The programmable imaging device of claim 13, further comprising instructions that when executed by the programmable control device, cause the programmable control device to perform actions, comprising:

performing the capturing, calculating, acquiring, comparing, determining, and identifying for each of one or more additional images, wherein the first image and the one or more additional images comprise a collection of images, and wherein the three-dimensional location for each of the collection of images is approximately co-located;

displaying a first image of the collection of images;

displaying one or more direction indicators, wherein each direction indicator corresponds to a direction of motion from the first image to another of the collection of images;

receiving a notification that one of the one or more direction indicators has been activated; and displaying a second image of the collection of images based on the notification, wherein the second image has a three-dimensional location corresponding to the direction of motion relative to the first image corresponding to the notification.

18. The programmable imaging device of claim 17, further comprising instructions that when executed by the programmable control device, cause the programmable control device to perform actions, comprising:

generating and displaying a visually smooth transition from the first image to the second image.

19. The programmable imaging device of claim 18, wherein the visually smooth transition is based, at least in part, on the three-dimensional representation of a predefined location represented at least in part in the first image.

20. A non-transitory program storage medium, on which is stored software to control a programmable device, the software comprising:

computer code for obtaining a first image;

computer code for acquiring object recognition information for the first image;

computer code for comparing the object recognition information to a plurality of three-dimensional representations of a plurality of noteworthy locations;

computer code for determining the first image includes a representation of at least a portion of one or more noteworthy locations based, at least in part, on the comparing;

computer code for identifying a three-dimensional location from which the first image was captured based, at least in part, on the determining and on location data corresponding approximately to a location from which the first image was captured; and computer code for associating the three-dimensional location with the first image.

21. The non-transitory program storage medium of claim 20, wherein the software stored thereon further comprises:

computer code for identifying an orientation for the first image based, at least in part, on the determining, wherein the orientation corresponds to an approximate direction from which the first image was captured.

22. The non-transitory program storage medium of claim 20, wherein the computer code for identifying a three-dimensional location comprises computer code for identifying a three-dimensional location based, at least in part, on the computer code for the determining and on the geodata.

23. The non-transitory program storage medium of claim 20, wherein the software stored thereon further comprises:

computer code for generating a visual three-dimensional transition between two images of a collection of images based, at least in part, on the three-dimensional location for each of the two images and at least one of the plurality of three-dimensional representations;

computer code for displaying a first image of the two images;

computer code for displaying the transition; and computer code for displaying a second image of the two images based, at least in part, on the transition.

24. The non-transitory program storage medium of claim 23, further comprising:

computer code for displaying a first image of the collection of images, each of which includes a representation of at least a portion of at least one of the plurality of three-dimensional representations; and computer code for displaying one or more direction indicators, wherein each direction indicator corresponds to a direction of motion from the first image to another of the collection of images.

25. The non-transitory program storage medium of claim 24, further comprising:

computer code for receiving a notification that one of the one or more direction indicators has been activated; and computer code for displaying a second image of the collection of images based on the notification, wherein the second image has a three-dimensional location corresponding to a direction of motion relative to the first image corresponding to the notification.

26. The non-transitory program storage medium of claim 25, further comprising computer code for generating and displaying a visually smooth transition from the first image to the second image.

27. A programmable imaging device, comprising:

a programmable control device;

a storage medium, coupled to the programmable control device; and software, stored on the storage medium, comprising instructions that when executed by the programmable control device, cause the programmable control device to perform actions, comprising:

receiving a first image, geodata associated with the first image, and an orientation associated with the first image;

comparing object recognition information associated with the first image to a plurality of three-dimensional representations of a plurality of predefined locations;

determining the first image includes a representation of at least a part of one or more of the predefined locations based, at least in part, on the comparing;

identifying a three-dimensional location from which the image was captured and the orientation based, at least in part, on the determining and the geodata; and associating the three-dimensional location and the orientation with the first image.

28. The programmable imaging device of claim 27, wherein the software further comprises instructions that when executed by the programmable control device cause the programmable control device to perform actions comprising:

calculating the object recognition information for an object represented by the first image.

29. The programmable imaging device of claim 27, further comprising:

a database, stored on the storage medium, wherein the plurality of three-dimensional representations of the plurality of predefined locations are stored in the database.

30. The programmable imaging device of claim 27, wherein the software further comprises instructions that when executed by the programmable control device cause the programmable control device to perform actions comprising:

querying a database, via a network coupled to the programmable imaging device, for the plurality of three-dimensional representations of the plurality of predefined locations.

31. The programmable imaging device of claim 27, wherein the software further comprises instructions that when executed by the programmable control device cause the programmable control device to perform actions comprising:

performing the receiving, comparing, determining, identifying, and associating for each of one or more additional images, wherein the first image and the one or more additional images comprise a collection of images, and wherein the three-dimensional location for each of the collection of images is approximately co-located;

generating a three-dimensional visual transition between two images of the collection of images based, at least in part, on the three-dimensional location for each of the two images and at least one of the plurality of three-dimensional representations;

displaying a first image of the two images;

displaying the transition; and displaying a second image of the two images based, at least in part, on the transition.

* * * * *